UNITED STATES PATENT OFFICE.

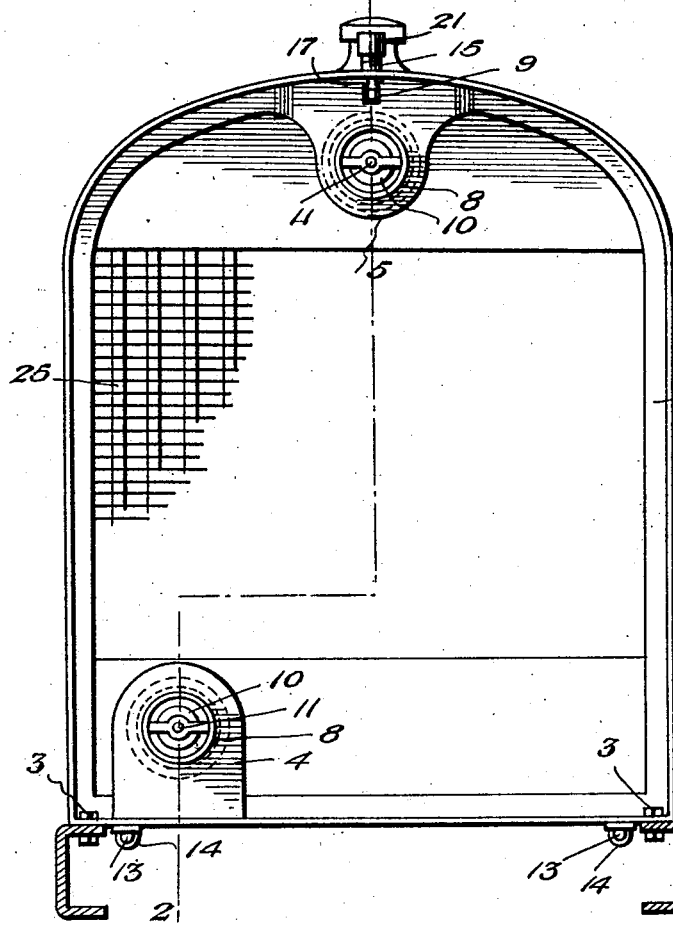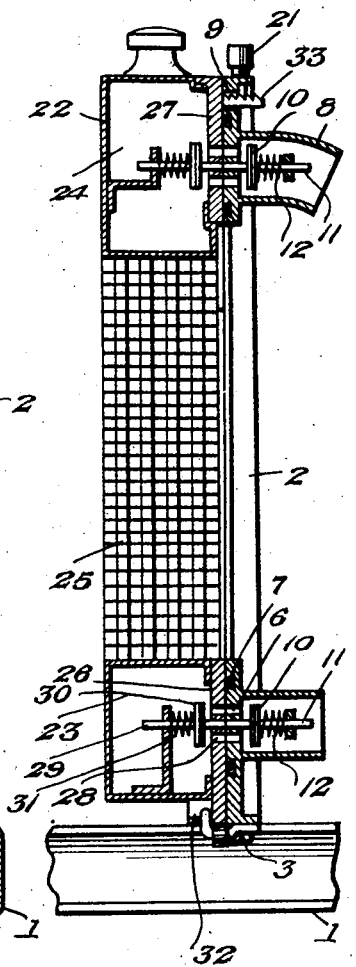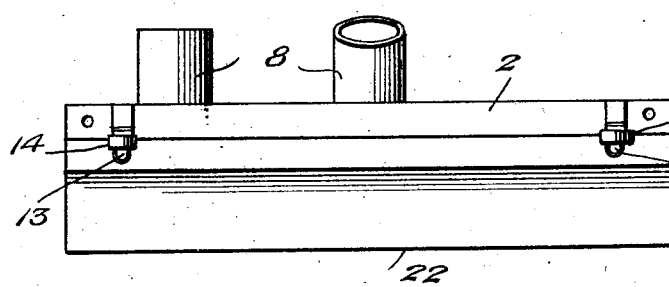

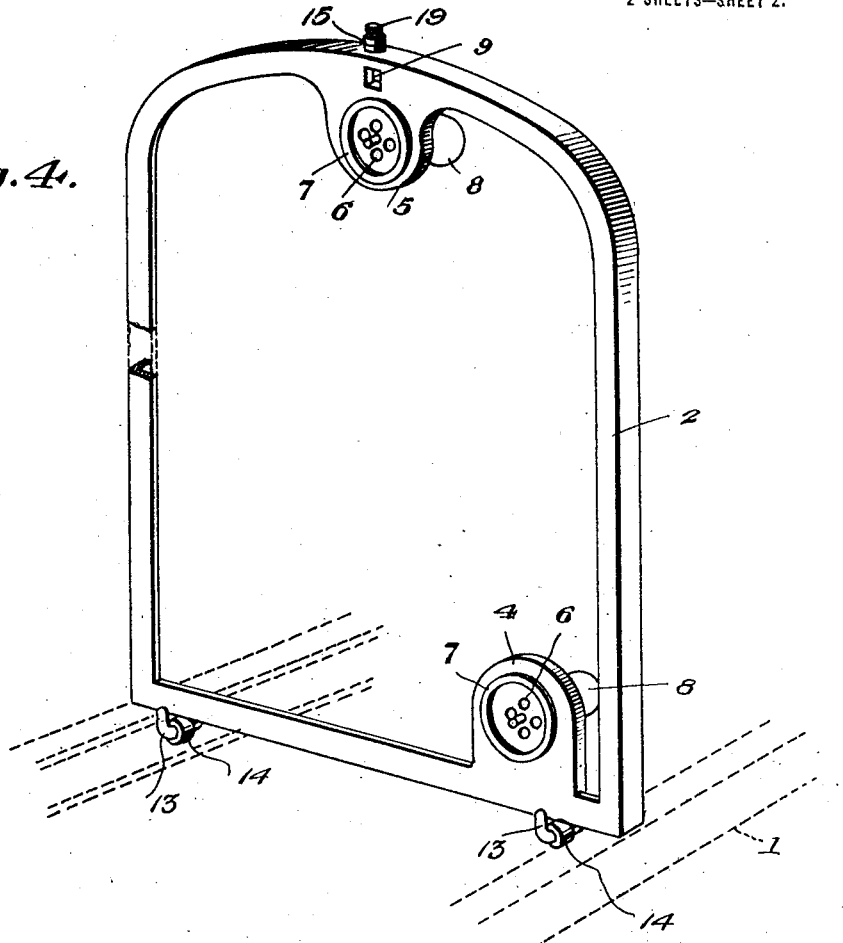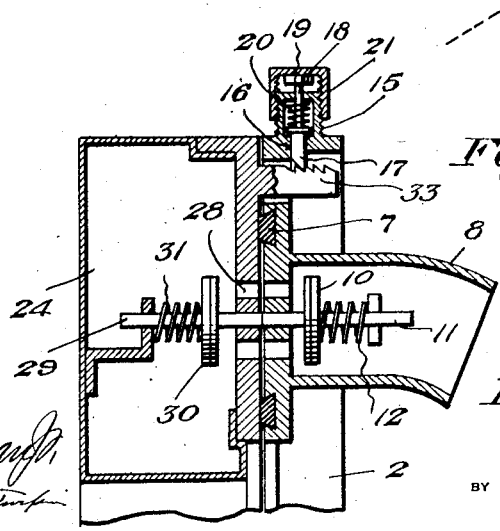

EUGENE L. EMORY, OF PORTSMOUTH, VIRGINIA.

AUTOMOBILE RADIATOR.

1,408,995. Specification of Letters Patent. Patented Mar. 7, 1922.

Application filed April 2, 1920. Serial No. 370,774.

*To all whom it may concern:*

Be it known that I, EUGENE L. EMORY, a citizen of the United States, residing at Portsmouth, in the county of Norfolk and State of Virginia, have invented new and useful Improvements in Automobile Radiators, of which the following is a specification.

The object of my invention is to provide a radiator so associated with and connected to an automobile that the radiator may be expeditiously, easily and completely detached as a unit and as readily replaced on an automobile, without leakage of water from the water jacket connections of the automobile or the radiator, and in such fashion that the placing of the radiator in proper working position will be attended by the establishment of connections between the water heads of the radiator and the water jacket of the automobile engine.

To the attainment of the foregoing, the invention consists in the improvement as hereinafter described and definitely claimed.

In the accompanying drawings, hereby made a part hereof:

Figure 1 is a vertical section taken from a view point at the right of Figure 2, looking toward the left.

Figure 2 is a vertical section taken on the line 2—2 of Figure 1.

Figure 3 is a bottom plan view illustrative of the improvement.

Figure 4 is a perspective view of the frame.

Figure 5 is an enlarged vertical section illustrative of the upper connection.

Similar numerals of reference designate corresponding parts in all of the views of the drawings.

I show in Figures 1, 2 and 4 automobile chassis portions 1.

In furtherance of the preferred embodiment of my invention, I superimpose upon the said chassis portions 1 an open frame 2 of angle iron, and I bolt the said frame 2 to the chassis portions 1, as indicated by 3, Figure 1. As clearly shown, the open frame 2 is provided with interior plates 4 and 5, the plate 4 extending upwardly from the lower transverse bar of the frame, and the plate 5 being a central pendent plate on the crown-bar of the frame. Each of the said plates 4 and 5 is apertured at 6, and each is equipped in its face with a gasket 7. Each plate 4 and 5 is also provided with a rearwardly extending conduit portion 8, for the connections to the water jacket of the automobile motor, and the upper plate 5 is provided at 9 with an aperture for an important purpose hereinafter set forth. In each of the pipe sections 8 is arranged a valve 10, having a stem 11 and subject to the action of a spring 12, the tendency of which is to press the valve forwardly so that normally the forward end of the valve stem will project beyond the face of the plate, Figure 4. Carried by the lower bar of the frame 2 are hooks 13 on which are annular pads 14, of rubber or other appropriate material, and carried on the crown-bar of the said frame 2, as best shown in Figure 5, is an exteriorly threaded housing 15 in communication with a guide aperture 16 in said crown-bar. The said housing 15 is for the play of a latching detent 17 that is guided in the aperture 16 and is provided with a stem 18 that extends through an aperture in the upper end of the housing 15 and carries a head 19. The housing 15 also contains a spring 20 to press the detent 17 downwardly, and on the housing is mounted an interiorly threaded removable cap 21. Manifestly when the said cap 21 is removed, the detent 17 may be readily raised against the action of the spring 20. When, however, the cap 21 is in the position shown, the detent 17 cannot be raised.

The radiator unit of my improvement is generally designated 22, and by preference includes the usual lower and upper water heads 23 and 24 and the core 25 intermediate of the said water heads. At its inner or rear side the radiator unit is provided with plates 26 and 27, each of which is apertured at 28 and each of which partially supports and guides the stem 29 of a valve 30 that is subject to the action of a spring 31, the tendency of which is to press the valve rearwardly so that the stem will normally project beyond the rear face of the plate, when the radiator unit 22 is disassociated from the frame 2. The apertures 28 of the radiator unit 22 are of course located for registration with the aperture 6 of the frame 2. At its under side the radiator unit 22 is provided with offset portions 32 in which are apertures to receive the hooks 13 of the frame 2, as best shown in Figure 2, so that when the unit is attached to the frame the lower edge of the unit will bear on and be cushioned by the pads 14. Carried by and extending rearwardly from the upper plate 27 of the radiator unit 22, is a toothed latch bar 33, designed to extend through the aperture 9 in the frame 2 and to be engaged and held by the detent.

By reference to Figures 2 and 5, it will be manifest that when the radiator unit 22 is placed on and in engagement with the hooks 13, and the latch bar 33 is engaged by the detent 17, the radiator unit 22 will be secured in opposed relation to the frame 2 without any liability whatever of casual disconnection; also, that at such time the valves 10 and 30 will operate to hold each other in open position, so that there will be free communication between the pipe sections 8, on the one hand, and the water heads of the radiator unit 22 on the other.

To disconnect and completely detach the radiator unit 22 from the frame 2, it is simply necessary for the operator to remove the cap 21, draw the detent latch 17 upwardly, and swing the upper portion of the radiator unit forwardly away from the frame 2, whereupon the radiator unit may be lifted from the hooks 13 and entirely disassociated from the frame 2. It will also be manifest that the said movement of the radiator unit 22 relative to the frame 2, will be attended by prompt closing of both sets of valves 10 and 30, with the result that there will be no leakage of water either from the pipe sections 8 or from the heads of the unit 22. This will be appreciated as an important characteristic of my invention when it is stated that no provisions whatever for the cutting off of water are necessary as a condition precedent to the removal of the radiator unit 22 from the automobile; and when it is further stated that it is frequently desirable to remove the radiator unit of an automobile in order to gain convenient access to parts in rear of the radiator unit.

It will further be apparent that the association of and the connection of the radiator unit 22 with the frame 2 will be attended by the automatic opening of the valves 10 and 30, due to the engagement between the opposed ends of their stems, Figure 2, and will also be attended by compression of the gaskets 7, which will then preclude leakage from the apertures in the confronting plates 4 and 5, on the one hand, and 26 and 27 on the other.

Having described my invention, what I claim and desire to secure by Letters-Patent, is:

1. In a radiator construction, the combination with a frame having pipe sections for connection with the water jacket of a motor and also having apertures in communication with said pipe sections, and further having an upper auxiliary aperture, spring-pressed valves in the pipe sections having stems adapted to extend forwardly beyond the face of the frame, gaskets carried at the face of the frame and surrounding the first-named apertures therein, hooks carried at the base of the frame, and a spring-pressed detent carried in the frame at a point in rear of said auxiliary aperture; of a removable radiator unit having apertures to register with the first-named apertures of the frame and apertured portions to receive the hooks on the frame, a latch bar on said unit in position to extend rearwardly through the auxiliary aperture of the frame and be engaged by the spring-pressed detent thereon, and spring-pressed valves for said radiator unit apertures and having stems adapted to be engaged by the valve stems of the frame.

2. In a radiator construction, the combination of a frame, means for connection with the water jacket of a motor, and a radiator unit detachably connected with and entirely removable from said frame and means, said means and radiator unit being each provided with an automatically closing valve, said valves automatically closing to prevent the escape of liquid when the radiator is removed from the frame and means.

3. In a radiator construction, the combination of a frame, means for connection with the water jacket of a motor, and a radiator unit detachably connected with and entirely removable from said frame, said means and radiator unit being each provided with automatic means to prevent the escape of liquid from the means and radiator unit when the radiator is removed from the frame.

4. In a radiator construction, the combination of a frame and a completely removable radiator unit opposed thereto; said frame and radiator unit having registered apertures and spring-pressed valves complementary to the apertures and coacting with each other so as to open when the radiator unit is placed in working relation to the frame.

5. The combination in a radiator construction, of a frame having base hooks and an aperture in its upper portion and also having water conducting means, a detent carried by the frame in rear of said aperture, and a removable radiator unit opposed to the frame and receiving and supported by the hooks and having a latch bar extending through the aperture of the frame and engaged by the detent thereof and also having water conducting means.

6. The combination in a radiator construction, of a frame having base hooks and an aperture in its upper portion and also having water conducting means, a detent carried by the frame in rear of said aperture, and a removable radiator unit opposed to the frame and receiving and supported by the hooks and having a latch bar extending through the aperture of the frame and engaged by the detent thereof and also having water conducting means; the said detent having an exterior portion, and the frame being equipped with removable means normally enclosing said exterior portion.

In testimony whereof I affix my signature.

EUGENE L. EMORY.